Patented July 17, 1951

2,560,612

UNITED STATES PATENT OFFICE 2,560,612

DRILLING FLUIDS AND METHODS OF USING SAME

Cary R. Wagner, Utica, Ohio, and Martin A. Ryan, Bartlesville, Okla., assignors to Phillips Petroleum Company, a corporation of Delaware No Drawing. Application December 10, 1945, Serial No. 634,153

20 Claims. (Cl. 252—8.5)

This invention relates to drilling fluids. In one of its more specific aspects, it relates to a drilling fluid comprising an aqueous solution of water soluble cellulose esters which are not precipitated or regenerated in any substantial degree by dilution with water and/or the usual dilute salt containing connate water of an oil well formation nor by the heat or cold generally obtainable in a well. In another specific aspect, it relates to the methods of use of such celluloses for controlling viscosity, gel strength, water loss and filter cake thickness of oil well drilling fluids.

In the art of drilling wells, especially drilling wells by the rotary method, it is necessary to use a drilling mud or drilling fluid, as is well understood in the art. The drilling mud lubricates the drill stem, carries the cuttings to the surface of the well, cools the drill bit, and forms a filter cake on the walls of the well preventing loss of at least any substantial amount of water from the drilling mud to the natural formations of the well. In order to perform these important functions properly, the drilling mud must have suitable viscosity and other qualities at all times.

The principal object of our invention is to provide a drilling mud which can be used in substantially all formations with reduced water loss, thin filter cake, and proper viscosity and gel strength.

Another object is to provide an improved drilling fluid.

Another object is to provide an improved method of drilling.

Another object is to provide drilling mud additives suitable for providing proper viscosity, gel strength, water loss and filter cake thickness of well drilling fluids.

Another object is to provide a drilling mud containing an aqueous solution of a water soluble (including by "water soluble" any substance substantially permanently dispersible or suspendable in water) cellulose ester which is not precipitated nor regenerated in any substantial degree by dilution with water and/or connate water, such as a suitable cellulose phosphate or sulfate.

Numerous other objects and advantages of this invention will be apparent to those skilled in the art upon reading the accompanying specification and claims.

In the present invention to obtain these objects we prefer to employ in a drilling mud cellulose such as a cellulose ester preferably made in somewhat the following manner:

Cellulose esters of inorganic acids are obtainable by causing an alkali cellulose to react with a chloride of an inorganic acid. The reaction occurs especially easily when using chlorides of polyvalent inorganic acids, as, for instance, of sulfuric or phosphoric acid.

The cellulose esters obtained by the process are colloidally dispersed in the presence of water. They are useful in drilling mud.

According to the conditions of the reaction different degrees of esterification of the cellulose are obtainable and the reaction products differ with respect to colloidal dispersion, conductivity and mechanical properties.

The speed of the reaction, the yield and the composition of the ester produced depend on the character of the acid chloride and the nature of the alkali cellulose. With chlorides of strong acids the reaction proceeds with great energy and with chlorides of more feeble acids and alkali cellulose the reaction proceeds slowly. The reactivity of the alkali cellulose depends on the manner in which it is previously treated. The best yield and the highest degree of esterification are achieved when cotton is used which has been swollen for at least four hours by means of a sodium hydroxide solution of 40 per cent strength at about −10° C. and has been pressed until its weight is double or threefold of the original weight. The course of the reaction may be influenced by choice of the parent material, by the concentration of the alkali hydroxide solution and by the duration of the treatment of the cellulose with the alkali, by the use of different proportions and different conditions of aggregation of the acid chloride, by regulating the reaction temperature and by using indifferent media, i. e. inert diluents, for the reaction.

The following examples illustrate methods of making cellulose esters of the type employed in the present invention, the parts being by weight:

1. 100 parts of bleached cotton-linters are swollen in sodium hydroxide solution of 40 per cent strength, while cooling with a mixture of ice and salt. After 4 hours the cotton is pressed until its weight is 300 parts. The soda-cellulose thus obtained is introduced in small portions into an ice-cold solution of 160 parts of phosphorous-oxychloride in 900 parts of benzene. The heat evolved first raises the temperature of the benzene to the boiling point and then the reaction takes a gentle course and tough magma settles to the bottom of the vessel. After 12 hours the supernatant liquid is drawn off and the deposit is washed with alcohol and ether, dried in a vacuum and treated with water. The colloidal aqueous dispersion is freed from all electrolytes by dialysis and from this purified dispersion cellulose phosphate is precipitated by addition of methanol. It is a nearly white body, colloidally dispersed by water and containing 16 per cent of $PO_4$. The yield amounts to 80 per cent of the weight of the cellulose used.

2. 100 parts of bleached cotton-linters are swollen by means of sodium hydroxide solution of 40 per cent strength while cooling with a mixture of ice and salt. After 4 hours the cotton is pressed until its weight is 400 parts and introduced in small portions into a mixture of 1800 parts of benzene and 220 parts of sulfuryl chloride. There is produced a cellulose-sulfuric acid ester which is worked up as described in Example 1. It is a pure whitish body colloidally dispersed by water and not hygroscopic; it contains 60 per cent of $SO_4$.

Such a cellulose is not precipitated or regenerated by dilution with water and/or the usual salt containing connate water. Nor is it precipitated by heat or cold generally obtainable in a well, or regenerated during use as a drilling fluid by aging or ripening as it is a substantially stable substance for a relatively long period of time. Substances which precipitate or regenerate under the above conditions we find are not suitable for use in drilling mud, although they may find some use as plugging agents for plugging wells, and therefore, are not related to the present invention. Such plugging agents would soon precipitate and fill the mud pit and also choke the drill stem in the hole.

The amount of said water soluble cellulose employed can be varied over rather a broad range as even small amounts give a corresponding smaller effect.

The cellulose esters mentioned above may be prepared by any other method known to the art.

Water soluble cellulose sulfate of this invention is not to be confused with water soluble cellulose acid sulfate and water soluble salts of cellulose acid sulfate whose use in drilling muds is disclosed and claimed in copending coassigned patent application Serial No. 15,053, filed March 15, 1948 by Cary R. Wagner, William N. Axe and Chester M. Himel. Cellulose acid sulfate contains the radical

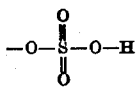

attached to an anhydroglucose unit residue of cellulose, and salts thereof replace the H of said radical by a cation, e. g. sodium. Cellulose acid sulfate and its salts are ionizable. Cellulose acid sulfate is prepared for example by reaction of cellulose with chlorosulfonic acid. On the other hand, water soluble cellulose sulfates of the invention of the present application have both of the indicated valences of the radical

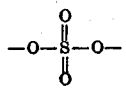

satisfied by anhydroglucose unit residues of cellulose, does not ionize, and does not form salts.

Any use of a cellulose such as the water soluble cellulose esters described herein to be retained in the mud throughout the entire normal life of the drilling mud is not to be confused with the use of some cellulose which is to be precipitated as an insoluble plugging agent in the formation. Nor is the use of a cellulose ester which is substantially stable to heat or cold or aging or ripening or dilution by water or dilute salts of connate water to be confused with plugging agents which are deliberately precipitated by such heat or cold or aging or dilution. We do not use our cellulose as a plugging agent at all, and while minor reactions in the well may form a colloidal haze of supposedly insoluble cellulose and while this colloidal cellulose may contact the formation, such minor traces of insoluble colloidal material is not comparable to the immediate precipitation of relatively massive insoluble plugging material. Drilling muds containing such cellulose are not subject to any injury by dilute salts to any detrimental degree in the amount used (which may be about 4 pounds of cellulose per barrel of mud) and in the concentration of salt of usual connate waters.

Such drilling mud containing cellulose derivatives described herein often have low initial gel strength which allows gas bubbles to come out of the drilling mud so rapidly that the drilling mud will not become gas cut. Elimination of gas cutting reduces the chances of blowouts. Such cellulose ester drilling muds are often characterized by a thin filter cake and by small water loss. This is very useful in avoiding loss of water in the formation, as well as the resultant swelling or caving of the formation which occurs with some formations. They do not generally ferment or spoil. Small quantities of well known fermentation inhibitors can be added but are not considered necessary.

It is understood that while a theory of operation has been advanced, it is not the only or necessary one, but has been advanced only to facilitate the disclosure. It is understood, however, that this invention is not limited to any theory of operation or action. It is further obvious that various changes may be made in the details without departing from the spirit of this invention, nor from the scope of the invention as defined in the following claims. Obviously, use in aqueous mud laden fluids includes use in the aqueous phase of an emulsion or mixtures with non-aqueous material. It is understood the invention is not to be limited to the specific details described. For example, tests with treating and control agents indicate that these celluloses are somewhat inert chemically and that all the normal and usual treating and control agents of the well drilling fluid and well controlling fluid arts may, after a simple test for lack of obvious adverse reactions, be employed without invention in our cellulose drilling and controlling fluids, and that with few, if any, exceptions they will be so employable. Our invention is therefore, to be defined by the following claims.

Having described our invention, we claim:

1. A process for forming a filter cake, having a low rate of filtration of fluid therethrough, on the wall of a well by the deposition of colloidal clayey solids from a water base drilling mud circulated along said wall which comprises admixing with said drilling mud and interacting therewith a water soluble cellulose derivative reaction product of an alkali cellulose and sulfuryl chloride made in the presence of an inert diluent in an amount sufficient to decrease the rate of filtration of fluid through said filter cake but insufficient to increase the viscosity of said drilling mud to such an extent as to render it uncirculatable and then forming said filter cake from the resulting drilling mud.

2. A water base well drilling mud comprising in combination sufficient water to maintain the mud as a fluid, sufficient clayey material to form a filter cake on the wall of the well, and a water soluble cellulose derivative reaction product of an alkali cellulose and sulfuryl chloride made in the presence of an inert diluent in an amount sufficient to reduce the water loss due to filtration through said filter cake but insufficient to increase the viscosity of said drilling mud to such an extent that it cannot be circulated.

3. A water base well drilling mud comprising an aqueous fluid mixture containing suspended solids which form a filter cake on the wall of the well, and a water soluble cellulose derivative reaction product of an alkali cellulose and sulfuryl chloride made in the presence of an inert diluent in an amount sufficient to reduce the water loss due to filtration through said filter cake but insufficient to increase the viscosity of said drilling mud to such an extent that it cannot be circulated.

4. A process for forming a filter cake, having a low rate of filtration of fluid therethrough, on the wall of a well by the deposition of colloidal clayey solids from a water base drilling mud circulated along said wall which comprises admixing with said drilling mud and interacting therewith a water soluble cellulose derivative reaction product of an alkali cellulose and phosphorus oxychloride made in the presence of an inert diluent in an amount sufficient to decrease the rate of filtration of fluid through said filter cake but insufficient to increase the viscosity of said drilling mud to such an extent as to render it uncirculatable and then forming said filter cake from the resulting drilling mud.

5. A water base well drilling mud comprising in combination sufficient water to maintain the mud as a fluid, sufficient clayey material to form a filter cake on the wall of the well, and a water soluble cellulose derivative reaction product of an alkali cellulose and phosphorus oxychloride made in the presence of an inert diluent in an amount sufficient to reduce the water loss due to filtration through said filter cake but insufficient to increase the viscosity of said drilling mud to such an extent that it cannot be circulated.

6. A water base well drilling mud comprising an aqueous fluid mixture containing suspended solids which form a filter cake on the wall of the well, and a water soluble cellulose derivative reaction product of an alkali cellulose and phosphorus oxychloride made in the presence of an inert diluent in an amount sufficient to reduce the water loss due to filtration through said filter cake but insufficient to increase the viscosity of said drilling mud to such an extent that it cannot be circulated.

7. A process for forming a filter cake, having a low rate of filtration of fluid therethrough, on the wall of a well by the deposition of colloidal clayey solids from a water base drilling mud circulated along said wall which comprises admixing with said drilling mud and interacting therewith a water soluble stable cellulose phosphate in an amount sufficient to decrease the rate of filtration of fluid through said filter cake but insufficient to increase the viscosity of said drilling mud to such an extent as to render it uncirculatable and then forming said filter cake from the resulting drilling mud.

8. A water base well drilling mud comprising in combination sufficient water to maintain the mud as a fluid, sufficient clayey material to form a filter cake on the wall of the well, and a water soluble stable cellulose phosphate in an amount sufficient to reduce the water loss due to filtration through said filter cake but insufficient to increase the viscosity of said drilling mud to such an extent that it cannot be circulated.

9. A water base well drilling mud comprising an aqueous fluid mixture containing suspended solids which form a filter cake on the wall of the well, and a water soluble stable cellulose phosphate in an amount sufficient to reduce the water loss due to filtration through said filter cake but insufficient to increase the viscosity of said drilling mud to such an extent that it cannot be circulated.

10. A process for forming a filter cake, having a low rate of filtration of fluid therethrough, on the wall of a well by the deposition of colloidal clayey solids from a water base drilling mud circulated along said wall which comprises admixing with said drilling mud and interacting therewith a water soluble stable cellulose sulfate in an amount sufficient to decrease the rate of filtration of fluid through said filter cake but insufficient to increase the viscosity of said drilling mud to such an extent as to render it uncirculatable and then forming said filter cake from the resulting drilling mud.

11. A water base well drilling mud comprising in combination sufficient water to maintain the mud as a fluid, sufficient clayey material to form a filter cake on the wall of the well, and a water soluble stable cellulose sulfate in an amount sufficient to reduce the water loss due to filtration through said filter cake but insufficient to increase the viscosity of said drilling mud to such an extent that it cannot be circulated.

12. A water base well drilling mud comprising an aqueous fluid mixture containing suspended solids which form a filter cake on the wall of the well, and a water soluble stable cellulose sulfate in an amount sufficient to reduce the water loss due to filtration through said filter cake but insufficient to increase the viscosity of said drilling mud to such an extent that it cannot be circulated.

13. A process for forming a filter cake, having a low rate of filtration of fluid therethrough, on the wall of a well by the deposition of colloidal clayey solids from a water base drilling mud circulated along said wall which comprises admixing with said drilling mud and interacting therewith a water soluble stable cellulose ester of a polyvalent inorganic acid selected from the group consisting of cellulose phosphate and cellulose sulfate, said ester being added in an amount sufficient to decrease the rate of filtration of fluid through said filter cake but insufficient to increase the viscosity of said drilling mud to such an extent as to render it uncirculatable and then forming said filter cake from the resulting drilling mud.

14. A water base well drilling mud comprising, in combination, sufficient water to maintain the mud as a fluid, sufficient clayey material to form a filter cake on the wall of the well, and a water soluble, stable cellulose ester of a polyvalent, inorganic acid selected from the group consisting of cellulose phosphate and cellulose sulfate, said ester being added in an amount sufficient to reduce the water loss due to filtration through said filter cake but insufficient to increase the viscosity of said drilling mud to such an extent that it cannot be circulated.

15. A water base well drilling mud comprising, in combination, sufficient water to maintain the mud as a fluid, sufficient suspended solids to form a filter cake on the wall of the well, and a water soluble, stable cellulose ester of a polyvalent, inorganic acid selected from the group consisting of cellulose phosphate and cellulose sulfate, said ester being added in an amount sufficient to reduce the water loss due to filtration through said filter cake but insufficient to increase the viscosity of said drilling mud to such an extent that it cannot be circulated.

16. A process for forming a filter cake, having a low rate of filtration of fluid therethrough, on the wall of a well by the deposition of suspended solids from a water base drilling mud circulated along said wall which comprises admixing with said drilling mud and interacting therewith a water soluble cellulose derivative reaction product of an alkali cellulose and sulfuryl chloride made in the presence of an inert diluent in an amount sufficient to decrease the rate of filtration of fluid through said filter cake but insufficient to increase the viscosity of said drilling mud to such an extent as to render it uncirculatable and then forming said filter cake from the resulting drilling mud.

17. A process for forming a filter cake, having a low rate of filtration of fluid therethrough, on the wall of a well by the deposition of suspended solids from a water base drilling mud circulated along said wall which comprises admixing with said drilling mud and interacting therewith a water soluble cellulose derivative reaction product of an alkali cellulose and phosphorus oxychloride made in the presence of an inert diluent in an amount sufficient to decrease the rate of filtration of fluid through said filter cake but insufficient to increase the viscosity of said drilling mud and to such an extent as to render it uncirculatable and then forming said filter cake from the resulting drilling mud.

18. A process for forming a filter cake, having a low rate of filtration of fluid therethrough, on the wall of a well by the deposition of suspended solids from a water base drilling mud circulated along said wall which comprises admixing with said drilling mud and interacting therewith a water soluble stable cellulose phosphate in an amount sufficient to decrease the rate of filtration of fluid through said filter cake but insufficient to increase the viscosity of said drilling mud to such an extent as to render it uncirculatable and then forming said filter cake from the resulting drilling mud.

19. A process for forming a filter cake, having a low rate of filtration of fluid therethrough, on the wall of a well by the deposition of suspended solids from a water base drilling mud circulated along said wall which comprises admixing with said drilling mud and interacting therewith a water soluble stable cellulose sulfate in an amount sufficient to decrease the rate of filtration of fluid through said filter cake but insufficient to increase the viscosity of said drilling mud to such an extent as to render it uncirculatable and then forming said filter cake from the resulting drilling mud.

20. A process for forming a filter cake, having a low rate of filtration of fluid therethrough, on the wall of a well by the deposition of suspended solids from a water base drilling mud circulated along said wall which comprises admixing with said drilling mud and interacting therewith a water soluble stable cellulose ester of a polyvalent inorganic acid selected from the group consisting of cellulose phosphate and cellulose sulfate, said ester being added in an amount sufficient to decrease the rate of filtration of fluid through said filter cake but insufficient to increase the viscosity of said drilling mud to such an extent as to render it uncirculatable and then forming said filter cake from the resulting drilling mud.

CARY R. WAGNER.
MARTIN A. RYAN.

REFERENCES CITED

The following references are of record in the file of this patent:

UNITED STATES PATENTS

| Number | Name | Date |
| --- | --- | --- |
| 1,082,490 | Berl | Dec. 30, 1913 |
| 1,848,524 | Hagedorn et al. | Mar. 8, 1932 |
| 2,025,073 | Rigby | Dec. 24, 1935 |
| 2,129,913 | Cross et al. | Sept. 13, 1938 |
| 2,336,171 | Freeland et al. | Dec. 7, 1943 |
| 2,337,296 | Kennedy et al. | Dec. 21, 1943 |
| 2,364,434 | Foster | Dec. 5, 1944 |
| 2,425,768 | Wagner | Aug. 19, 1947 |

OTHER REFERENCES

Perkins et al.: The Effect of Certain Gums and Starches on Filtration of Salt-Water Muds at Elevated Temperatures—article in The Oil Weekly, November 2, 1942, page 45.

Chaney: A Review of Recent Advances in Drilling Mud Control—article in The Oil Weekly, November 23, 1942, page 25.